United States Patent [19]

Yoshida

[11] Patent Number: 4,672,614
[45] Date of Patent: Jun. 9, 1987

[54] SEMICONDUCTOR MEMORY DEVICE WITH PARALLEL ADDRESSING AND DATA-CORRECTING FUNCTIONS

[75] Inventor: Masaaki Yoshida, Tokyo, Japan
[73] Assignee: NEC Corporation, Tokyo, Japan
[21] Appl. No.: 683,446
[22] Filed: Dec. 19, 1984

[30] Foreign Application Priority Data
Dec. 21, 1983 [JP]  Japan ................. 58-241274

[51] Int. Cl.⁴ .............................. G06F 11/10
[52] U.S. Cl. ......................... 371/38; 371/49; 371/13
[58] Field of Search ............ 371/37, 38, 49, 50, 371/51, 13

[56] References Cited
U.S. PATENT DOCUMENTS 4,360,917  11/1982  Sindelar ................. 371/51
4,453,251  6/1984   Osman ................... 371/51
4,464,755  8/1984   Stewart .................. 371/51
4,472,805  9/1984   Wacyk ................... 371/51
4,528,666  7/1985   Cline .................... 371/51

*Primary Examiner*—Michael R. Fleming
*Attorney, Agent, or Firm*—Sughrue, Mion, Zinn, Macpeak and Seas

[57] ABSTRACT

An improved error-correction type semiconductor memory device operates at high speed. The memory is provided with a pair of row address buffers which can operate independently, and when error correcting operation is performed for the data related to the address contents of one of the buffers, the access operation of the data cell array is conducted by the other of the buffers, thereby enabling the memory device to simultaneously carry out parts of the operation of successive read-out operations.

12 Claims, 9 Drawing Figures

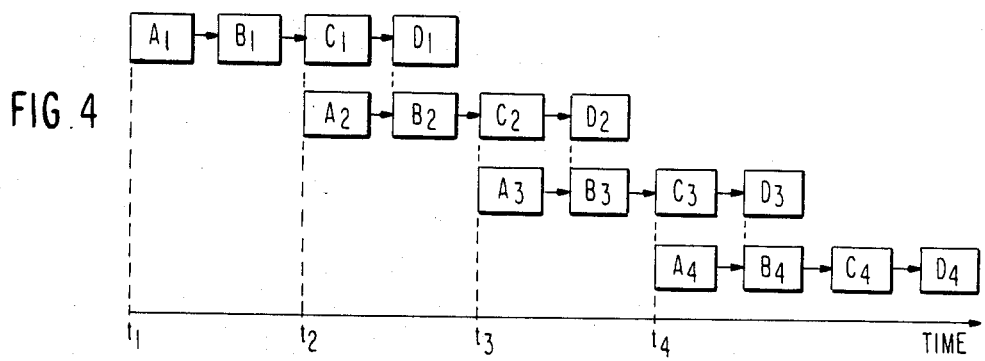
FIG. 4
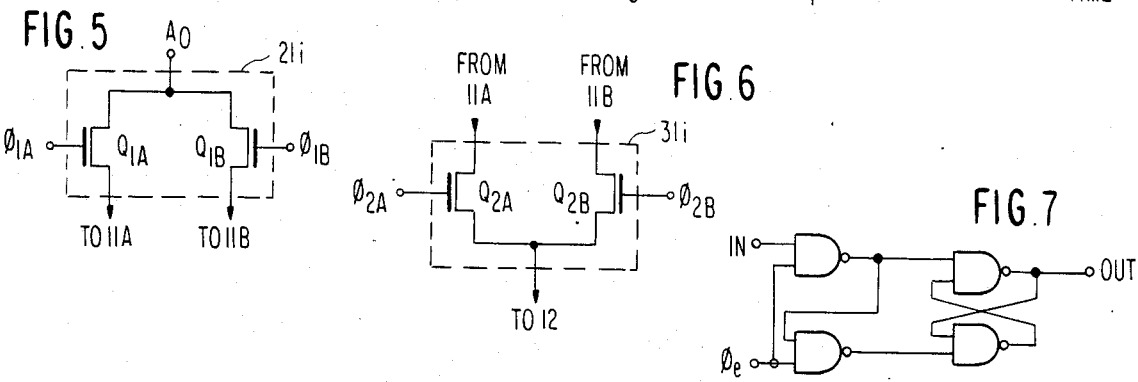
FIG. 5
FIG. 6
FIG. 7
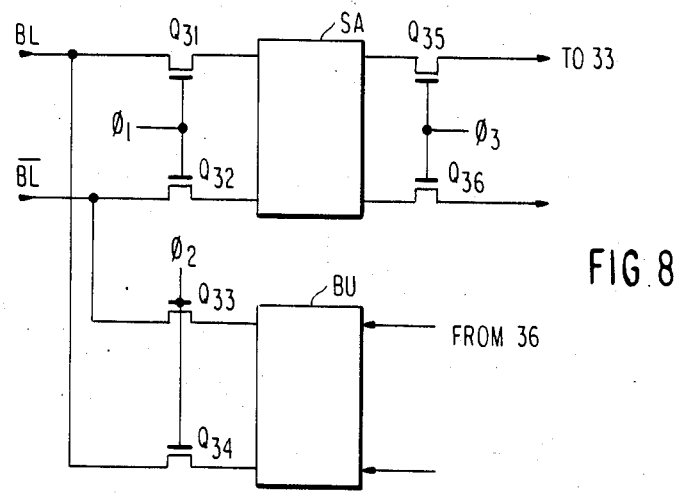
FIG. 8
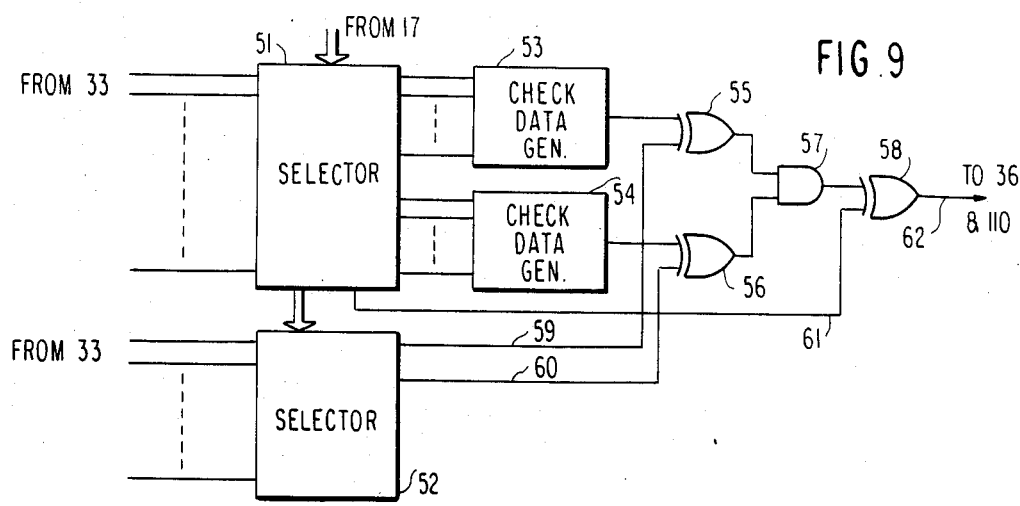
FIG. 9

SEMICONDUCTOR MEMORY DEVICE WITH PARALLEL ADDRESSING AND DATA-CORRECTING FUNCTIONS

BACKGROUND OF THE INVENTION

This invention relates to a semiconductor memory device and more particularly to a semiconductor memory device incorporating an error self-correcting circuit.

Recent developments in the semiconductor memory device technology has resulted in a remarkable reduction in the size of a memory cell.

The miniaturization of the memory cell has led to reduction in the quantity of the stored charge, and this has made alpha-induced soft-errors a serious problem. Moreover, a power supply voltage drop is also expected when the internal electric field of the miniaturized device is optimized. Thus, it becomes extremely difficult to secure soft-error resistance such as is presently available in the case of semiconductor memories having larger storage capacities.

Methods of solving this problem and allowing a semiconductor memory to have a larger capacity include incorporating into the memory an error self-correcting circuit for automatically checking and correcting soft-errors within the memory chip. One such method is the multi cell 1-bit method wherein a plurality of memory cells are assigned to store one bit of information to mask the soft-error generated in one cell. Another is the method wherein error-correcting codes are used. In view of the circuit scale additionally necessary for correcting errors, the method employing error-correcting codes is deemed a promising one.

According to a proposed error correction method, a check cell array is provided in addition to a normal memory cell array. An error-correcting circuit receives read-out signals from the memory cell array and the check cell array to generate a correcting signal, which is used for correcting the data to the read-out. The disadvantage of such a conventional semiconductor memory device having an error self-correcting circuit is that the access time as a whole tends to become longer because it takes a significant amount of time to generate the correcting signal in the correcting circuit. The larger the scale of the memory, the greater the number of data bits applied to the correcting circuit and the greater the number of checking bits applied thereto. Accordingly, the time required to correct errors increases, which makes it impossible to read and write data at a high speed, constituting a significant shortcoming of such prior devices.

SUMMARY OF THE INVENTION

It is an object of the present invention to provide an error-correction type semiconductor memory device which can operate at high speed.

The memory device according to the present invention is of the type having a data cell array for storing data to be accessed, a parity cell array for storing parity check data to be used for checking the data stored in the data cell array, the data cell array and the parity cell array including storage cells arranged in rows and columns. The device includes a first row address buffer for holding row address data, a row decoder for selecting the rows of the data cell array and the parity cell array, and an error correction circuit for correcting data read from the data cell array in accordance with the data stored in the parity cell array. A second row buffer for holding the row address data is provided in parallel with the first row buffer. According to the present invention, successive read-out operations are conducted in overlapped time sequences, such that the memory array accessing of a given read-out operation takes place during error correction of a just prior read-out operation. Also, the amplification of the accessed data of the second read-out operation occurs simultaneously with the outputting and rewriting operation of the first read-out operation.

The ability of the device to process data per unit time is remarkably improved so that the effective access time of the memory is enhanced.

BRIEF DESCRIPTION OF THE DRAWINGS

FIG. 4 is a timing diagram showing the operation of the memory according to the invention;

FIG. 5 is a circuit diagram showing the structure of the multiplexer 21 of FIG. 3;

FIG. 6 is a circuit diagram showing the structure of the multiplexer 31 of FIG. 3;

FIG. 7 is a block diagram showing a flip-flop employed in registers 33 and 36;

FIG. 8 is a partial block diagram of the circuit 15' of FIG. 3; and

FIG. 9 is a block diagram of the circuit 18 of FIG. 3.

DETAILED DESCRIPTION OF THE INVENTION

Figure 1:
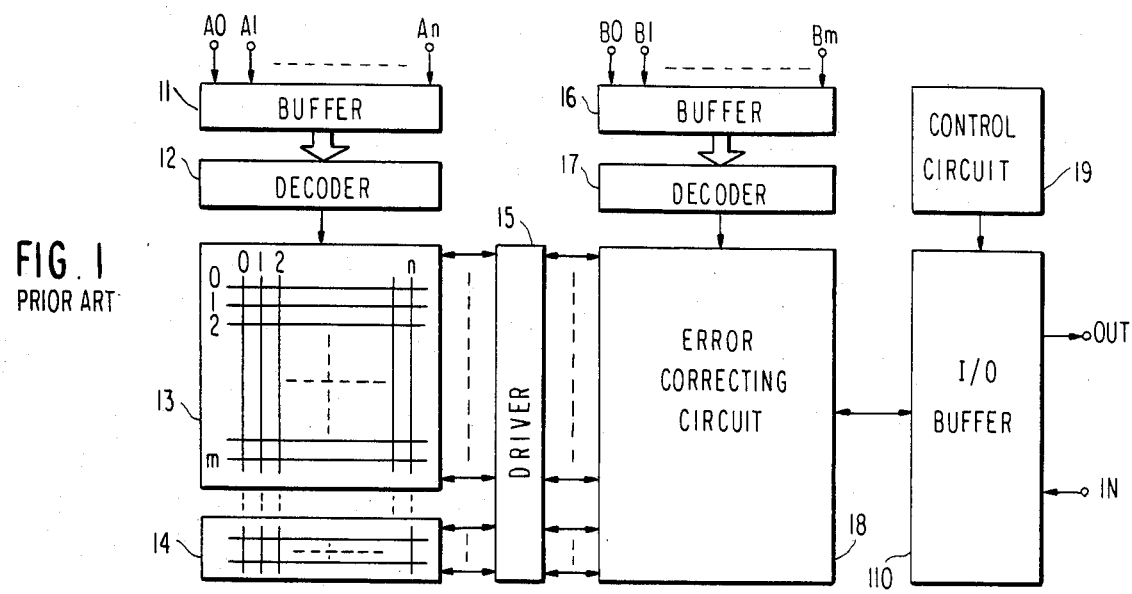
FIG. 1 is a block diagram showing a memory device including an error correcting circuit according to the prior art.

FIG. 1 shows an example of the configuration of a previously known semiconductor memory device having an error self-correcting circuit using parity codes.

In FIG. 1, an array 14 of parity cells (parity cell array) is provided in conjunction with a memory cell array 13 consisting of (n+1) rows (shown vertically in FIG. 1) and (m+1) columns (shown horizontally in FIG. 1). The rows are common to memory cell array 13 and parity array 14. In the array 13 and the parity cell array 14, storage cells of the same structure are arranged at the intersections of the rows and the columns. The rows of the arrays 13 and 14 are selected by row address signals $A_o$–$A_n$ via a row buffer 11 and a row decoder 12 in a known manner. The read-out signals from the storage cells associated with the selected row are transmitted through the column lines to a digit driver circuit 15, which includes sense amplifiers, and are amplified therein. The amplified signals from driver 15 are applied to an error-correcting circuit 18. The circuit 18 also receives a column selection signal generated by a column decoder 17, which receives column address signals $B_o$ to $B_m$ via a column buffer 16. In the circuit 18, a correcting signal is generated in response to the signal read from arrays 13 and 14. The data is then corrected in circuit 18 in a known manner. The corrected read-out data generated by the circuit 18 is then transfered to an I/O buffer 110 and is simultaneously re-written to the selected cells of the array through driver circuit 15. The I/O buffer 110 outputs the corrected read-out control circuit 19.

Figure 2:
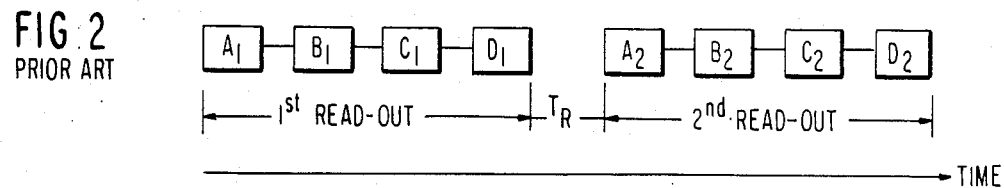
FIG. 2 is a timing diagram showing the operation of the memory of FIG. 1.

With reference to FIG. 2, the time sequence of the operation of the above memory will be described. Block $A_1$ indicates the time of the operation from receipt of the row address signals $A_o$ to $A_n$ to appearance of the read-out data signals on the respective columns of the arrays 13 and 14. Namely $A_1$ represents the operation time period from the start of a first read-out operation to the time when both the arrays 13 and 14 generate the signals on the respective columns. Therefore, $A_1$ relates to the whole operation time of the blocks 11, 12, 13 and 14. The time of the operation from the occurrence of the read-out signals on the respective columns to the completion of amplifying the above readout signals by the circuit 15 is indicated by $B_1$. In response to the amplifying operation of the circuit 15, the error correcting circuit 18 starts its operation to generate the corrected read-out data. The time of this operation of the circuit 18 is indicated by $C_1$. Then, after the generation of the corrected read-out data by the circuit 18, the I/O buffer 110 outputs the corrected data during the operation period $D_1$. Also, during the period $D_1$, the corrected data is re-written to the selected cells. Thus, the first read operation is completed. After a reset period, $T_R$, a second read-out operation, as indicated by time blocks $A_2$, $B_2$, $C_2$ and $D_2$, is carried out.

Typical values of the respective operation times $A_1$ ($A_2$), $B_1$ ($B_2$), $C_1$ ($C_2$) and $D_1$ ($D_2$) are 50 ns, 30 ns, 50 ns and 50 ns, respectively. Therefore, for a complete read-out operation, at least 180 ns is required.

As is clear from the above explanation, the presence of correction circuit 18 introduces an additional operation time that would not be necessary in the absence of error correction. Therefore, as a whole, the access time per unit of read-out signal becomes longer by the operation time ($C_1$) of the circuit 18. The larger the scale of the memory, the greater the number of data bits applied to the circuit 18, and the greater the operation time required of the circuit 18, resulting in relatively low speed operations.

Figure 3:
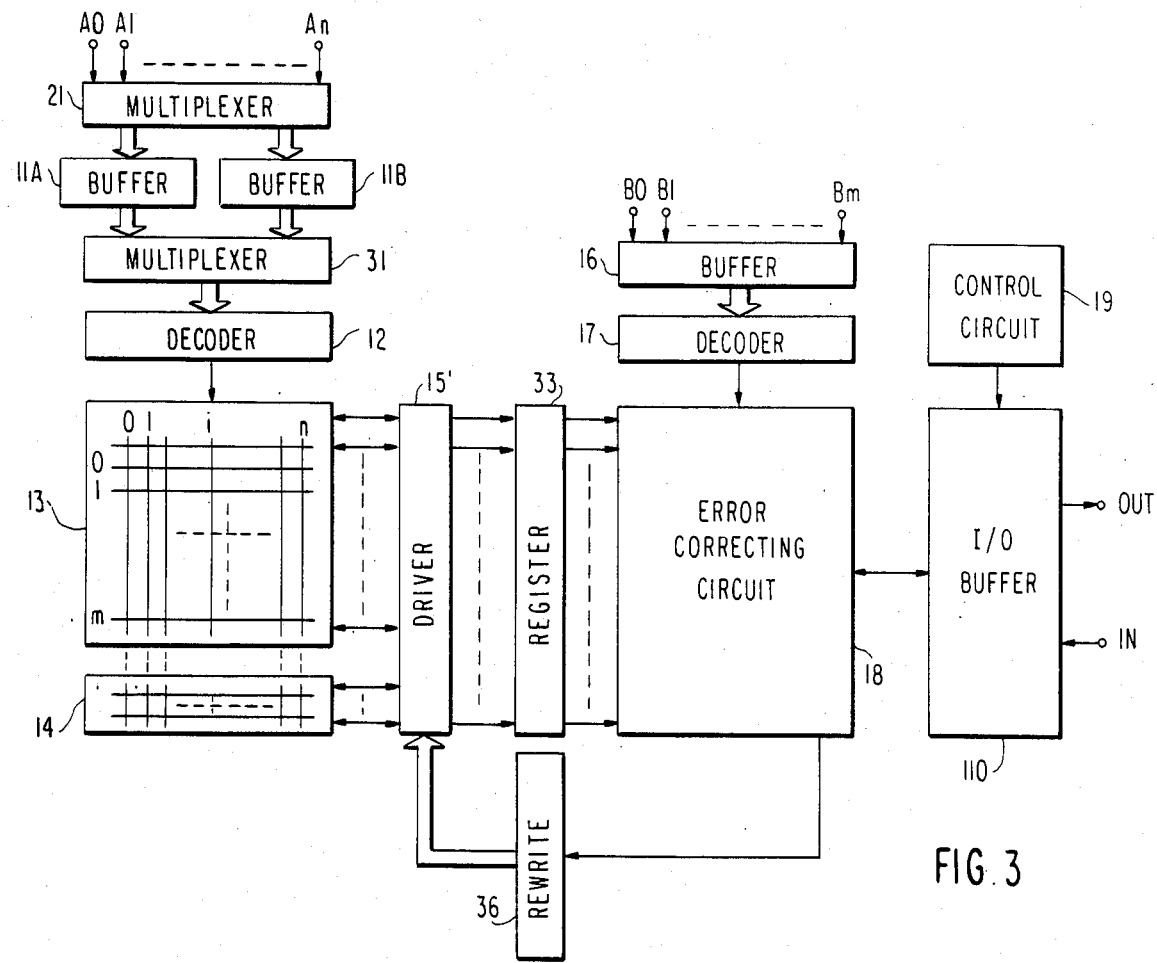
FIG. 3 is a block diagram showing a memory device according to the present invention.

Referring now to FIGS. 3 and 4, a preferred embodiment of the invention will be described in detail.

In FIG. 3, the portions corresponding to those of FIG. 1 are indicated by the similar reference numerals. In FIG. 3, two sets of address buffers, 11A and 11B, are provided. These buffers, 11A and 11B, are adapted to receive the row address signals $A_o$ to $A_n$ through an input multiplexer 21. The outputs of the buffers 11A and 11B are applied to the row decoder 12 through an output multiplexer 31. In other words, the input multiplexer 21 selectively applies the set of address signals to one of the buffers 11A and 11B while the output multiplexer 31 selectively transmits the buffer outputs of 11A and 11B to the decoder 12. Both of the buffers, 11A and 11B, have latch functions for holding the row address signals.

An input register 33 is provided between the digit drive circuit 15' and the error correcting circuit 18. The register 33 performs the function of holding data from the circuit 15'. A re-write register 36 is provided to store data to be re-written to the arrays 13 and 14. The register 36 is adapted to receive the data from register 33 and the corrected data from the circuit 18. The corrected data held in the register 36 is transferred to the circuit 15' and to the arrays 13 and 14.

Thus, the row address signals are given to one of the row address buffers 11A and 11B selectively through the multiplexer 21, and the multiplexer 31 selectively connects one of the buffers 11A and 11B to the decoder 12. Also, the signals from the arrays 13 and 14 are applied to the register 33 through the circuit 15'. The output of the register 33 is also applied to the register 36 as well as to the circuit 18.

The column address signals $B_o$ to $B_m$ are applied to the column address buffer 16 and to the circuit 18 through the column decoder circuit 17. After the read-out is corrected by the circuit 18, it is sent to the I/O buffer 110 and the register 36. The contents of register 36 are written to the arrays 13 and 14.

In FIG. 4, the suffixes attached to A, B, C, and D indicate the sequence of the operations. For example, the suffix "1" represents the first operation and "2" represents the second operation.

At time $t_1$, a first read-out operation is initiated. The row address signals $A_o$ to $A_n$ are transferred to the buffer 11A through the multiplexer 21 and latched in the buffer 11A. The latched row address signals in the buffer 11A are applied to the row decoder 12 to select the i-th row of the arrays 13 and 14. In response to the selection of the i-th row, the cells coupled to the i-th row are enabled to generate read-out signals on the respective columns of the arrays 13 and 14. The time of the above operation is indicated as "$A_1$" in FIG. 4. Thereafter, the signals on the respective columns are amplified by the sense amplifiers included in the circuit 15' and applied to the register 33. The time of these operations are shown as $B_1$ in FIG. 4. At time $t_2$, the circuit 18 starts its error correction operation in a known manner and sends the corrected data to register 36 and buffer 110. This takes place during the period indicated by $C_1$. Simultaneously with the latter operations, row address signals for the second read operation are applied to the buffer 11B through the multiplexer 21 and to the row decoder 12 through the multiplexer 31. The decoder selects the j-th row of the arrays 13 and 14 so that signals from the cells of the j-th row are generated on the respective columns. These operations take place during the period shown by $A_2$; which coincides with the period $C_1$. The signals generated by the second access operation are amplified and then stored in the register 33 during the time period indicated by $B_2$. Also, the contents of the buffer 11A are again applied to the decoder through the multiplexer 31 to select the i-th row, and the corrected data held by the register 36 is re-written to the i-th row of the arrays 13 and 14 through the circuit 15'. Simultaneously, the buffer 110 outputs the corrected read-out signal as a read output. The above re-write operation and output operation occur during the period $D_1$ of FIG. 4 which coincides with $B_2$.

At time $t_3$, the circuit 18 performs its error correction operation for the second data read from the array and stored in the register and, after the correction operation, the circuit 18 sends the corrected data to the register 36 and the buffer 110, during the period $C_2$. Also, at this time, the next row address signals for the next access are applied to the buffer 11A and further to the decoder 12 through the multiplexer 31. Thus, the decoder 12 selects the k-th row of the arrays 13 and 14 so that signals stored in the cells of the k-th row appear on the respective columns. The time of the latter operations is indicated by $A_3$. Then, after the read-out signals on the columns are stored in the register 33, the row address is returned from the k-th row to the j-th row. Under this condition, the corrected data stored in the register 36 is re-written to the arrays 13 and 14 through the circuit 15' while the buffer 110 outputs the corrected data to the outside ($D_2$).

Operations continue in the same manner with the later operations of a given read-out sequence occurring simultaneously with the earlier operations of a next succeeding read-out sequence.

As explained above, according to the invention, one part (C, D) of the operation and the other part (A, B) of the subsequent operation are conducted in parallel. Therefore, the effective operation speed for obtaining a unit of data can be remarkably enhanced. For example, in the case where the values of A, B, C and D are 50 ns, 30 ns, 50 ns and 50 ns, respectively, the effective operation speed can be improved by 100 ns.

Referring to FIGS. 5 to 9, examples of the major blocks of the memory of FIG. 3 are explained below.

FIG. 5 shows a unit structure $21_i$ of the multiplexer 21. A transistor $Q_{1A}$ transfers the row address signal $A_o$ to the buffer 11A when it is conducting in response to $\phi_{1A}$, while a transistor $Q_{1B}$ transfers $A_o$ to the buffer 11B in response to $\phi_{1B}$.

A unit structure $31_i$ of the multiplexer 31 is shown in FIG. 6. Transistors $Q_{2A}$ and $Q_{2B}$ transfer the signals from the buffers 11A and 11B to the decoder 12 in response to control signals $\phi_{2A}$ and $\phi_{2B}$, respectively.

The registers 33 and 36 are composed of a plurality of flip-flops, each of which is shown in FIG. 7.

FIG. 8 shows the structure per each bit of the circuit 15'. A pair of digit lines BL and $\overline{BL}$ are input to the sense amplifier SA through transfer gate transistors $Q_{31}$ and $Q_{32}$ controlled by $\phi_1$. The outputs of the sense amplifier SA are applied to the register 33 via transfer gate transistors $Q_{35}$ and $Q_{36}$. Also, the pair of digits lines BL and $\overline{BL}$ are connected to a pair of inputs of a buffer BO which receives the output of the register 36 through transistors $Q_{33}$ and $Q_{34}$. When the signals on the columns are amplified, $\phi_1$ is kept high with $\phi_2$ and $\phi_3$ held low. After completion of the amplifying operation, $\phi_1$ is returned to a low state. When the stored data in the sense amplifier SA is input to the register 33, $\phi_3$ is maintained high with $\phi_1$ and $\phi_2$ low.

In the case of re-writing the corrected data to the arrays, $\phi_2$ is kept high while $\phi_1$ and $\phi_3$ are low.

Various architectures may be used as the error correcting circuit 18. One example of such circuit 18 is shown in FIG. 9. A selector 51 re-arranges the data from the array 13 via the register 33 in two dimensions, i.e, horizontal and vertical groups, and in response to the output of the decoder 17, sends the horizontal group of data and vertical group of data to a horizontal parity check circuit 53 and a vertical parity check circuit 54, respectively. A selector 52 receives the data from the array 14 through the register 33 and outputs horizontal parity data 59 and vertical parity data 60 in response to the output of the decoder 17. The circuits 53 and 54 generate a horizontal check data and a vertical check data, respectively. The data 59 is compared with the horizontal data by an exclusive-OR gate 55 while the data 60 is compared with the output of the circuit 54 by an exclusive-OR gate 56. The outputs of the gates 55 and 56 are input to an AND gate 57 and then to an exclusive-OR gate 52 to which the selected read-out data 61 by the selector 51 is applied. The gate 58 generates the corrected read-out data 62.

As described above, the semiconductor memory device of the invention is very useful because it makes possible a high-speed access allowing the access time of such a semiconductor memory device to be roughly halved.

What is claimed is:

1. A memory device operable by a plurality of time frames each composed of a first time period and a second time period subsequent to said first time period, comprising:

a data cell array for storing data at intersections of rows and columns therein and being accessable to read and write data from and to, respectively, a selected row therein, a parity cell array for storing parity check data at intersections of rows and columns therein and being accessable to read and write parity check data from and to, respectively, a selected row therein, the rows in said parity cell array being in common with the rows in said data cell array, means for receiving row address variables, first row selection means for selecting a first row address of said data cell array and parity cell array in said first period of each of said time frames in accordance with first row address taken from said receiving means, driver means for amplifying and storing the data read from a selected first row of said data cell array and said parity cell array in said second time period of each time frame, error correction circuit means, connected to said driver means, for correcting the data read from said data cell array in dependence upon the data read from said parity cell array to provide corrected data in said first time period of a time frame subsequent to the time frame in which the data to be corrected have been read out, register means for storing said corrected data, second row selection means for selecting a second row of said data cell array and parity cell array in said second time period of said subsequent time frame in accordance with second row address taken from said receiving means, said first row address and second row address being different from each other, output means for generating an output signal based on said corrected data in said second time period of said subsequent time frame, and means for rewriting the corrected data stored in said register means to said second row of said data cell array and parity cell array in said second time period of said subsequent time frame.

2. A memory device as claimed in claim 1 wherein said first and second row selection means comprise, jointly, a first row address buffer for storing a row address applied thereto, a second row address buffer for storing a row address applied thereto, a first multiplexer responsive to a row address input applied thereto for selectively inputting said row address to said first and second row address buffers, whereby said two buffers usually store successive addresses of rows to be accessed for read out of said data cell array and parity cell array, row address decoder means responsive to a row address applied thereto for accessing the corresponding row of said data cell array and parity cell array for reading or writing, and a second multiplexer for selecting one of the addresses in said first and second buffers for application to said row address decoder.

3. A memory device as claimed in claim 2 wherein said driver means comprises a bank of sense amplifiers and a storage register for storing the uncorrected data after read-out from a selected row and amplification by said bank of sense amplifiers.

4. A memory device as claimed in claim 3 wherein said register means for storing corrected data is connected as an input to said bank of sense amplifiers.

5. A semiconductor memory device operable by a plurality of time frames each composed of a first time period and a subsequent second time period, comprising: means for receiving row address signals, a first row address buffer, a second row address buffer, a first multiplexer adapted to selectively apply said row address signals to said first and second row address buffers, a data cell array for storing data to be accessed, a parity cell array for storing parity data, said data cell array and parity cell array including storage cells arranged in rows and columns, a row selection circuit for selecting rows of both of said arrays, a second multiplexer adapted to selectively apply the outputs of said first and second row buffers to said row selection circuit, said first multiplexer supplying first row address and second row address received by said receiving means at different times to said first row address buffer and said second row address buffer, respectively, an error-correction circuit for correcting the data from the column of said data cell array by the data from said parity cell array, a first register having input terminals receiving signals from the columns of both of said arrays and output terminals coupled to the input of said error correction circuit, a second register adapted to receive the corrected data by said error correction circuit and means for operatively applying the output of said second register to the columns of both of said arrays, in which data from the row defined by said first row address of both of said arrays are read-out and stored in said first register during each time frame, and data from the row defined by said second row address from both of said arrays are read out while data which have been read from the row defined by said first row address in said each time frame are corrected by said error-correction circuit and the corrected data are stored in said second register during a first period of the time frame subsequent to the time frame in which said data stored in said first register means have been read out and the row defined by said first row address of both of said arrays is selected again and said corrected data stored in said second register are rewritten into the row defined by said first address during a second period of said subsequent time frame.

6. The memory device according to claim 5, wherein said applying means includes a plurality of transfer gates each coupled between an associated one of said columns and an associated one of said output terminals of said second register.

7. The memory device according to claim 5, further comprising means for receiving column address signals and column selection means for selecting the column to be output.

8. The memory device according to claim 7, wherein said column selection means selectively applies the signals from said column to said error correction circuit.

9. A memory device operable by a plurality of time frames each composed of a first time period and a second time period subsequent to said first time period, comprising:

a data cell array for storing data at intersections of rows and columns therein and being accessable to read and write data from and to, respectively, a selected row therein, a parity cell array for storing parity check data at intersections of rows and columns therein and being accessable to read and write parity check data from and to, respectively, a selected row therein, the rows in said parity cell array being in common with the rows in said data cell array, means for receiving row address variables, first row selection means for selecting a row address of said data cell array and parity cell array in accordance with first row address taken from said receiving means, driver means for amplifying and storing the data read from a selected row of said data cell array and said parity cell array, error correction circuit means connected to said driver means for correcting the data read from said data cell array in dependence upon the data read from said parity cell array to provide corrected data, register means for storing said corrected data, second row selection means for selecting a second row of said data cell array and parity cell array in accordance with second row address taken from said receiving means, said first row address and second row address being different from each other, output means for generating an output signal based on said corrected data, means for rewriting the corrected data stored in said register means to said second row of said data cell array and parity cell array, first control means for controlling said second row selection means, said driver means and said error correction circuit means so that data and parity check data from said second row are read out from said driver means and data which have been read out in the previous time frame from said first row are corrected by said error correction circuit in said first time period, and second control means for controlling said first row selection means, said rewriting means and said register means so that the corrected data stored in said register means are rewritten into said first row of said data cell array and said parity cell array in said second time period.

10. A memory device as claimed in claim 9 wherein said first and second row selection means comprise, jointly, a first row address buffer for storing a row address applied thereto, a second row address buffer for storing a row address applied thereto, a first multiplexer responsive to a row address input applied thereto for selectively inputting said row address to said first and second row address buffers, whereby said two buffers usually store successive addresses of rows to be accessed for read out of said data cell array and parity cell array, row address decoder means responsive to a row address applied thereto for accessing the corresponding row of said data cell array and parity cell array for reading or writing, and a second multiplexer for selecting one of the addresses in said first and second buffers for application to said row address decoder.

11. A memory device as claimed in claim 9 wherein said driver means comprises a bank of sense amplifiers and a storage register for storing the uncorrected data after read-out from a selected row and amplification by said bank of sense amplifiers.

12. A memory device as claimed in claim 9 wherein said register means for storing corrected data is connected as an input to said bank of sense amplifiers.

* * * * *